Patented July 1, 1947

2,423,108

UNITED STATES PATENT OFFICE 2,423,108

N³-CARBOXYACYL-METANILAMIDES

Maurice L. Moore, Detroit, Mich., and Tony M. Immediata, Wilmington, Del., assignors to Sharp & Dohme, Incorporated, Philadelphia, Pa., a corporation of Maryland No Drawing. Application July 7, 1943, Serial No. 493,750

7 Claims. (Cl. 260—302)

This invention relates to N³-carboxyacyl-metanilamides in which the carboxyacyl group is the radical remaining when the hydroxyl group is removed from only one of the two or more carboxyl groups of a polycarboxylic acid, and the invention covers such products containing the remaining carboxyl group or groups unaltered as well as with the hydrogen in any of such remaining carboxyl groups replaced by a carboxylate-forming element or radical.

The new products of this invention are in general therapeutically useful in varying degrees and applications, for example, in treating ailments of the intestinal tract.

The products of this invention may be represented by the general formula

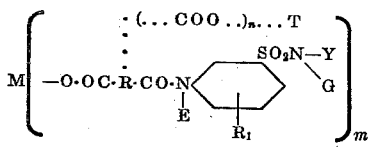

in which M is selected from hydrogen and monovalent and polyvalent radicals capable of combining with a carboxyl radical to form a carboxylate, such as the alkali metals sodium, potassium, lithium and the like, the alkaline earths as calcium, magnesium, barium and the like, antimony, copper, gold, iron, bismuth, and manganese and the like, an alkyl radical, a nitrogen base as ammonium and corresponding radicals of alkyl amines and alkanolamines and the like; and R is the residue of a polycarboxylic acid, aliphatic, aromatic, as well as heterocyclic, stripped of its carboxyl groups; and T is selected from hydrogen and the M-monovalent radicals and free valences of the M-polyvalent radicals not satisfied by the single carboxyl group shown directly linked to M; and $n$ is selected from zero and any whole number up to four, whereby the grouping (. . . COO . . .)$_n$ . . . T represents the carboxyl and the carboxylate groups over two from any polycarboxylic acid having more than two carboxyl groups, and $m$ is a small number selected from the class consisting of (A) one, in those compounds embraced herein in which all of the carboxyl groups in the carboxyacyl radical satisfy all of the valences of any polyvalent radicals represented by M and T, and (B) a small number equal to the valences of M, in those compounds embraced herein and selected from those (a) in which $n$ is zero, (b) in which each occurrence of the radical T is selected from hydrogen and any of the monovalent radicals represented by T, and (c) in which each occurrence of the radical T is different from the radical M; and E and G are each separately selected from hydrogen as well as an alkyl radical, saturated or unsaturated, for example, methyl, ethyl, propyl, butyl, amyl, allyl, hexyl, heptyl, octyl and the like, or decyl, dodecyl, hexadecyl and the like, as well as an aralkyl radical as benzyl and the like, as well as an aryl radical as phenyl, unsubstituted as well as substituted, for example, having nitro, amino, alkyl, carboxyl, sulfonic acid, hydroxy, alkoxy with the alkyl saturated or unsaturated and straight or branched chain, phenyl, halogen such as chlorine, and the like substituents, as well as the naphthyl and diphenyl radicals, each similarly unsubstituted as well as substituted, and a nitrogen-containing radical as nitro and amino (unsubstituted and substituted as acyl- and alkyl-), and an oxygenated radical, for example, hydroxy, alkoxy such as methoxy, ethoxy, propoxy, and carbalkoxy such as carbmethoxy, carboxyl, and haloalkyl as chlorethyl and the like, and halogen, for example, chlorine and bromine; $R_1$ is a substituent-radical attached to the di-valent phenyl radical of the metanilamide group in a position selected from ortho and para to the sulfonamido group, which substituent-radical may be such as an alkyl radical as methyl, ethyl and the like, an oxygenated radical as the hydroxy group, the carboxy group, and an alkoxy group as methoxy, ethoxy and the like, a halogen such as chlorine and the like; and Y may be such as hydrogen, or the hydroxyl group, or an alkyl radical, or an alkyl radical containing an alcoholic hydroxyl substituent, or a heterocyclic radical attached to the sulfonamido nitrogen, for example, selected from the group consisting of azoles, azines, purines and polynuclear, e. g., bicyclic, heterocyclic groups.

The azolyl group represented by Y may be that of a thiazole derivative, such as thiazole, dihydrothiazole as thiazoline, and their respective nuclear substituted derivatives or of a pseudothiohydantoin as a thiazolone and the nuclear substituted derivatives thereof, or of an oxazole derivative such as oxazole, iso-oxazole, oxazoline, or of a diazole derivative such as an imidazole derivative, as imidazole or benzimidazole, and their respective nuclear substituted derivatives.

The azyl substituent represented by Y may be the residue of a mono- as well as bi-nuclear azine from which a hydrogen atom has been removed from the element of any ring in the nucleus thereof, by which the substituent is attached to the sulfonamide nitrogen, which azine may be nuclearly substituted or unsubstituted, for example, a pyridine as pyridine itself, or a thiazine as meta-thiazine or para-thiazine or their hydro-derivatives, either di- or tetra-hydro, and the nuclearly substituted derivatives of any of them, or a diazine such as the pyridazines (1,2-diazines or ortho-diazines), as pyridazine, or the pyrimidines (1,3-diazines or meta-diazines), for example, pyrimidine, or the pyrazines (1,4-diazines or para-diazines), as pyrazine, or the hydro-derivatives, such as the di-, tetra- or hexa-hydro derivatives of any of these types of diazines, for example, piperazine, as well as the nuclearly substituted derivatives of any of these diazines, whether hydrogenated or not.

Any of these azines may be built up of fused nuclei or of linked nuclei (in which the two nuclei are joined by a single bond) and in each case may consist of bicyclic groupings containing the same number of atoms in each nucleus or a different number of atoms in each nucleus and in which one nucleus or both nuclei may be heterocyclic. The quinazolines (quinazoline and its nuclear substituted derivatives) exemplify the bicyclic groupings, e. g., the fused nuclei grouping and those in which each nucleus contains the same number of atoms, namely 6, and in which one nucleus is heterocyclic and the other homo- or iso-cyclic. The xanthines (xanthine and its nuclear substituted derivatives) are also built up of fused nuclei and illustrate the bicyclic groupings in which there is a different number of atoms in each nucleus, namely 5 and 6, and in which each nucleus is heterocyclic, while the substituted pyrimidyl derivatives such as phenyl-pyrimidines (whether substituted in either or each nucleus) represent the binuclear groupings in which each nucleus has the same number of carbon atoms, namely 6 and 6, and in which the two nuclei are linked together by a single bond and one nucleus is heterocyclic, and the other is isocyclic.

The nuclear substituent on any of the various azines or on any of the azyl groups may be of the hydrocarbon radical type such as the saturated or unsaturated alkyl radicals, straight or branched chain or cyclic, monovalent mono- or di-substituent, for example, methyl, di-methyl, ethyl, di-ethyl, propyl, butyl, iso-butyl, amyl, allyl, methallyl, cyclo-pentyl and -hexyl, cyclopentenyl and the like, or any aryl radical such as phenyl, tolyl, naphthyl, or aralkyl radical as benzyl and the like, or polyvalent as polyalkylene such as polymethylene, e. g., tetramethylene and the like, or may be a radical containing oxygen or sulfur as the hydroxyl group or an alkoxy group such as methoxy, ethoxy, propoxy and the like, or the corresponding sulfur analog radical such as an alkylthio radical as methylthio or ethylthio group and the like, or the carbalkoxy radical as carbomethoxy, carbethoxy or carboxy and the like, or may also be a halogen radical, for example, chlorine or bromine. One or more nuclear substituents may occur on the same heterocyclic nucleus, for example, on the pyrimidyl nucleus, and, in the latter case, they may be identical or different examples of the same type or of entirely different types.

The purine radical represented by Y may be that of a caffeine derivative.

The various heterocyclic radicals attached to the sulfonamido nitrogen may be linked thereto at any of the elements in the heterocyclic radical having a replaceable hydrogen, for example, in the pyridines at the carbon atom in the 2-position, in the pyrimidines at the carbon atom in the 2-, 4- or 5-position, in pyridazines at the carbon atom in the 3- or 4-position, in the pyrazines at the carbon atom in the 2-position, and similarly with the other heterocyclic radicals. Thus, the position of attachment of the heterocyclic radical to the sulfonamido nitrogen is determined by such position on the heterocyclic nucleus on which an amino group can be found in the individual heterocyclic compound.

The carboxyacyl group (remaining group when the hydroxy group is removed from only one of the at least two carboxyl groups of a polycarboxylic acid) may be derived from any desirable polycarboxylic acid, for example, aliphatic, aromatic, and heterocyclic, such as the aliphatic polycarboxylic acids as the saturated aliphatic polycarboxylic acids such as the dicarboxylic acids, oxalic and malonic acids and their methylene-non-substituted homologues, succinic, glutaric, adipic, pimelic, suberic, azelaic and sebacic acids and the like, and derivatives thereof exemplified by malonic acid and its homologues, in any of which at least one of the hydrogens of at least one of the available chain methylene groups is replaced by any desirable substituent, for example, alkyl (saturated as well as unsaturated), hydroxy, amino, carboxyl, and the like. Of such derivatives, the saturated-alkyl-substituted-methylene type is shown by the mono-alkyl examples as methyl-malonic, ethyl-malonic, butyl-malonic, pyrotartaric (methyl-succinic) and ethyl-succinic acids, and the saturated-dialkyls by dimethyl-malonic and diethyl-malonic acids, and the unsaturated-alkyl by allyl-malonic acid. The hydroxy-substituted-methylene type is exemplified by tartronic (hydroxy-malonic) and malic (hydroxy-succinic, in the three isomeric forms) acids and the polyhydroxy-substituted by the dihydroxy type shown by tartaric (dihydroxy-succinic) acid and the tetrahydroxy example in talomucic acid. The amino-substituted-methylene type is demonstrated by aspartic (amino-succinic) and glutamic acids. The mixed-substituted-methylene type is shown by citramalic (2-hydroxy-2-methyl-butanedioic) and citric acids, the latter serving also to point out the carboxylic-substituted-methylene type.

Unsaturated aliphatic dicarboxylic acids from which the carboxyacyl radical is derived correspond to any of the above mentioned saturated examples having at least four carbon atoms and further particularized by maleic and citraconic (methylmaleic) acids and their respective isomers, fumaric and mesaconic (methylfumaric) acids.

Other aliphatic polycarboxylic acids from which the carboxyacyl radical may be derived are the tribasic, saturated as well as unsaturated, acids exemplified respectively by tricarballylic and aconitic acids and derivatives thereof as those in which any of the methylene or chain hydrogens is replaced by any desirable substituent (as pointed out in relation to the dicarboxylic acids) illustrated by citric acid.

The aromatic (aryl) polycarboxylic acids from which the carboxyacyl radical may be derived may be an aryl dicarboxylic acid or aryl tricarboxylic acid as trimellitic acid as well as one containing up to six carboxyl groups, as mellitic acid, and those having replaceable hydrogen atoms may or may not have other substituents on the aromatic nucleus. Those having no substituents on the aromatic nucleus are illustrated by the aryl dicarboxylic acids, such as the isomeric phthalic acids, phthalic (ortho), isophthalic (meta) and terephthalic (para). In those having other substituents on the nucleus, such substituents may be illustrated by alkyl (mono- and di-), alkoxy, hydroxy, halo, nitro and other common groups, for example, xylidic (or uvitic, 5-methyl-1,3-dicarboxylicbenzene), cumidic (dimethyl-phthalic), hemipic (dimethoxy-phthalic), and coccinic (hydroxy-methyl-phthalic) acids. While the above specifically named aromatic acids illustrate the mononuclear or phenyl-polycarboxylic acid type, these aromatic polycarboxylic acids include also those of the polynuclear type such as the naphthyl polycarboxylic acids as naphthalic (naphthalene-1,8-dicarboxylic acid), naphthalene-1,2-dicarboxylic acid, naphthalene-2,3-dicarboxylic acid, naphthalene-1,4-dicarboxylic acid and naphthalene-1,5-dicarboxylic acid.

The heterocyclic polycarboxylic acids from which the carboxyacyl radical may be derived may be any desirable heterocyclic polycarboxylic acid, for example, the pyridine polycarboxylic acids as the dicarboxypyridines such as quinolinic acid (2,3-dicarboxypyridine), lutidinic acid (2,4-dicarboxypyridine), 2,5-dicarboxypyridine, cinchomeronic acid (3,4-dicarboxypyridine), dipicolinic acid (2,6-dicarboxypyridine), and dinicotinic acid (3,5-dicarboxypyridine), also the diazine polycarboxylic acids as the dicarboxydiazines, for example, the dicarboxy-pyrazines, such as antipellagric acid (2,3-dicarboxypyrazine), 2,5-dicarboxypyrazine and 2,6-dicarboxypyrazine, as well as the derivatives thereof substituted on the nucleus, for example, those alkyl-substituted on the nucleus, as the homologs of antipellagric acid such as the nuclear-monoalkyl derivatives, as 2,3-dicarboxy-5-methyl-pyrazine, and the nuclear-dialkyl derivatives as 2,3-dicarboxy-5,6-dimethyl-pyrazine, as well as 2-carboxy-3-methyl-5-carboxy-6-methyl pyrazine, and also dicarboxypyridazines such as 4,5-dicarboxypyridazine as well as the derivatives thereof substituted on the nucleus, such as those alkyl substituted on the nucleus as 4,5-dicarboxy-3,6-dimethyl-pyridazine, and also the dicarboxypyrimidines such as 4,5-dicarboxypyrimidine and 4,6-dicarboxypyrimidine. Also included are the thiazole polycarboxylic acids such as the dicarboxythiazoles, as well as the derivatives thereof substituted on the nucleus, such as 2-methyl-4,5-dicarboxythiazole.

Since the carboxyacyl group is defined herein as the group remaining when the OH group is deleted from only one of the at least two carboxyl groups of a polycarboxylic acid, the expression "acyl" of the term "carboxyacyl" then indicates the acidyl radical resulting from removing that OH group from the particular carboxyl group involved in the definition.

The invention also includes the preparation of these N³-carboxyacylsulfanilamides by heating the desired polycarboxylic acid, its anhydride, or an ester, such as an alkyl ester, or a monohalide, such as the monochloride or a monochloride of the ester or acid chloride such as the di-acid chloride, thereof with, for example, any desired metanilamide additionally substituted in the position ortho- or para- to the sulfonamide radical, either merely together or in an inert reaction medium such as an inert solvent, and as in the latter case separating the desired end product or, as in the case of the use of the ester or the acid chloride, liberating the end product by hydrolysis, and in any case, where necessary, subjecting it to purification as by reprecipitation or recrystallization. Thus, for example, with the aliphatic dicarboxylic acids having less than four carbon atoms in the chain, the alkyl diester of the dicarboxylic acid is reacted with the metanilamide selected. With the aliphatic acids having four and five carbon atoms in the chain and with the aromatic polycarboxylic acids having two carboxyl groups ortho to each other, the desired anhydride is taken as the starting material, while with the aliphatic acids having over five carbon atoms in the chain and with the aromatic acids having no carboxyl group in ortho position to another carboxyl group, the free acid may be heated directly with the selected metanilamide. If desired, the monohalide of the ester of any of the acids may be used as the starting material.

The invention may be illustrated by, but not restricted to, the following:

A. *Derivatives of p-methylmetanilamide*

Example 1: *p - methyl - N³-succinylmetanilamide.*—12 grams of succinic anhydride was added to a refluxing suspension of 18.7 grams of p-methyl metanilamide in 200 cc. of anhydrous alcohol. The solution cleared almost immediately. The reaction mixture was refluxed for an additional 15 minutes and concentrated to small bulk. A small portion of ethyl acetate was added and the reaction solution was then warmed and then there was added a portion of isopropyl ether. A slightly gummy solid, weighing 26.06 grams was obtained, a small portion of which was purified by first dissolving it in dilute sodium hydroxide solution and precipitating the product with hydrochloric acid and then crystallizing from water. The product was obtained as needle crystals, melting, after drying at 100° C., at 183–184° C. with mild frothing.

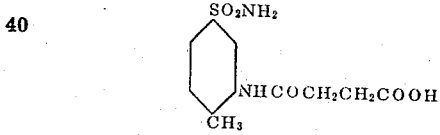

Example 2: *p-methyl-N³-phthalylmethanamide.*—To a boiling solution of 9.3 grams of p-methyl-metanilamide, dissolved in a mixture of 50 cc. anhydrous isopropyl alcohol and 35 cc. methyl "Cellosolve," was added 9.0 grams of phthalic anhydride. The reaction mixture was refluxed an additional 15 minutes, then chilled, and treated with solvent naphtha. 16.3 grams of solid was obtained, which melted at 192° C. A small portion, after purification by dissolving in saturated sodium bicarbonate solution and precipitating by acidifying with hydrochloric acid, followed by crystallization from methyl "Cellosolve" and water melted at 194–196° C. with decomposition (plate crystals).

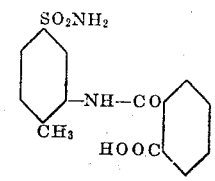

By replacing the succinic or phthalic anhydride in either of the two preceding examples by the corresponding equivalent amount of pyrazinoic anhydride, there is obtained p-methyl-N³-pyrazinoyl-metanilamide.

Example 3: *2-(p-methyl-N³-succinylmetanilamido)-thiazole.*—2.2 grams of succinic anhydride were added to a refluxing solution of 5.34 grams of 2-(p-methyl-metanilamido)-thiazole in a mixture of 20 cc. of anhydrous isopropyl alcohol and 15 cc. of methyl "Cellosolve." After boiling continued for four minutes after the addition, the solution was evaporated to small bulk and diluted with water. The resulting solid was dissolved with sufficient saturated sodium bicarbonate solution, decolorized with charcoal, the charcoal filtered off and the product precipitated by adding hydrochloric acid to the filtrate, as a semi-solid (M. P. 207–208° C. with decomposition). It was purified further by dissolving in saturated bicarbonate, reprecipitating with hydrochloric acid and crystallizing several times from methyl "Cellosolve" and water (M. P. 217–218° C. with decomposition).

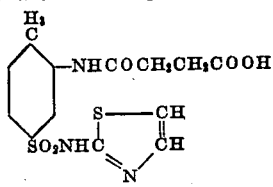

By replacing the succinic anhydride in this example separately by the equivalent of pyrazinoic anhydride and phthalic anhydride respectively, there is obtained 2-(p-methyl-N³-pyrazinoylmetanilamido)-thiazole and 2-(p-methyl-N³-phthalylmetanilamido)-thiazole.

The 2-(p-methyl-metanilamido)-thiazole employed in Example 3 was prepared by adding 0.6 cc. concentrated hydrochloric acid in 25 cc. of 50% alcohol dropwise to a stirred boiling suspension of iron filings in a solution of 11.2 grams of 3-nitro-4-methyl-phenyl-sulfonamidothiazole in 50 cc. of 50% alcohol and iron powder, continuing the stirring for two hours after the addition was completed. The reaction mixture was filtered while hot and the alcoholic filtrate neutralized with sufficient 20% caustic soda solution to neutralize the acid and diluted with an equal volume of water. Ammonium sulfide was added to precipitate the iron as sulfide which was filtered off and the filtrate evaporated to dryness.

The 3-nitro-4-methyl-phenyl-sulfonamidothiazole was prepared by condensing 3-nitro-4-methyl-sulfonyl chloride and 2-amino thiazole in equimolecular quantities in solution in dry pyridine by procedure similar to that in the condensation of acetyl-aminobenzenesulfonyl chloride with aminothiazole to form sulfathiazole.

B. Derivatives of o-methyl-metanilamide

*Example 4: o - methyl - N³-succinylmetanilamide.*—A 15% excess of succinic anhydride was added to 9.3 grams of o-methyl-metanilamide dissolved in a mixture of isopropyl alcohol and 30 cc. of methyl "Cellosolve" and the procedure of Example 3 followed, yielding 12.4 grams of a product melting at 198–199° C., which purified by crystallizing first from alcohol and water, and then from methyl "Cellosolve" and water melted at 206–206.5° C. with decomposition (needle crystals).

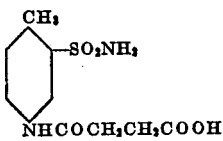

By replacing the succinic anhydride in this example separately by the corresponding equivalent of phthalyl or pyrazinoic anhydride, there is obtained respectively the corresponding o-methyl-N³-phthalyl-metanilamide and o-methyl-N³-pyrazinoyl-metanilamide.

*Example 5: 2-(o-methyl-N³-phthalylmetanilamido)-thiazole.*—2.6 grams of phthalic anhydride were added to a refluxing suspension of 4.0 grams of 2-(o-methyl-metanilamido)-thiazole in 25 cc. of isopropyl alcohol. The reaction product was separated by taking the reaction mixture up in saturated sodium bicarbonate as in the other examples, decolorizing and filtering, and reprecipitating it by the addition of an excess of hydrochloric acid. The crude desired product crystallized as a solid from methyl alcohol in the form of needles which melted at 131–132° C., solidified on further heating and finally melted with decomposition at 290° C.

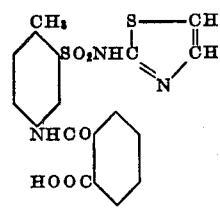

C. Derivatives of p-hydroxy-metanilamide

*Example 6: p - hydroxy-N³-succinylmetanilamide.*—To a boiling solution of 11.3 grams of p-hydroxy-metanilamide in 100 cc. of alcohol was added 7.2 grams of succinic anhydride. The reaction mixture was boiled for three additional minutes and then cooled. 6 grams of solid was obtained which melted with mild frothing at 196.5° C. It crystallized from water as well shaped prisms which, after drying at 100° C., melted at 213–214° C. with decomposition.

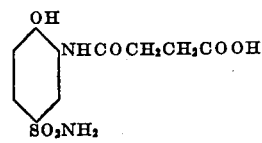

*D. p-chloro-metanilamide derivatives.*—Starting with 3-amino-4-chloro-phenyl-sulfonamide and following procedures similar to those in the foregoing examples, and using separately succinic, phthalic and pyrazinoic anhydride, there results respectively p-chloro-N³-succinylmetanilamide, p-chloro-N³-phthalylmetanilamide and p-chloro-N³-pyrazinoylmetanilamide. If instead of the 3-amino-4-chloro-phenyl-sulfonamide there is employed respectively separately 2-(3-amino-4-chloro-phenyl-sulfonamido)-thiazole or 2-(3-amino-4-chloro-phenyl-sulfonamido)-4- methylpyrimidine, there results respectively 2-(p-chloro-N³ - succinylmetanilamido)-thiazole and -4-methylpyrimidine. If instead of using the p-chloro-metanilamides just noted, there are used the corresponding o-chloro-metanilamides, the corresponding group of compounds with the chloro-radical in ortho-position are obtained. If instead, the p-carboxy-metanilamides are used, the corresponding p-carboxy-carboxyacyl-metanilamides result.

While the metanilamides with the sulfonamido nitrogen unsubstituted have been illustrated along with that nitrogen linked to a 2-thiazolyl radical and a 2-(4-methyl-pyrimidyl)-radical, by employing the desired starting metanilamido-heterocycle, the corresponding compounds can be obtained with Y of the structural formula representing the nuclei of other of the heterocyclic groups hereinabove disclosed.

While the various illustrations have exemplified the use of certain individual aliphatic, aromatic and heterocyclic polycarboxylic acids, others within the general scope of the possible polycarboxylic acids hereinabove disclosed may be used to obtain the corresponding carboxyacyl metanilamides.

Likewise, by using in any of the specific examples or in any of the particular modifications thereof just above suggested resulting from employing a different metanilamido heterocycle, a different polycarboxylic acid or different anhydride of a polycarboxylic acid, from any of those specifically included in any particular example or in all of the examples, for example, from among the various aliphatic, aromatic and heterocyclic polycarboxylic acids referred to in the tenth to fifteenth paragraphs of this specification or embraced by the scope of the description thereof, there are obtained the corresponding compounds of the invention in which R of the structural formula in the third paragraph of this specification is the residue of any suitable selected heterocyclic polycarboxylic acid stripped of its carboxyl groups and in which Y is any of the indicated heterocyclic radicals, all of which different individual compounds are included as a portion of this disclosure in view of their ready configuration to one skilled in the art in the light of the preceding explanation and without extending the length of this specification to list them separately.

The carboxylate form of any of the compounds of the invention may be prepared, for example, by adding to a small amount of water an excess of the compound over its solubility in water and dissolving the excess by stirring in a sufficient quantity of, for example, anhydrous sodium carbonate. The solution is preferably filtered and from the filtrate the highly soluble sodium salt can be isolated, for example, by adding an equal volume of alcohol and pouring the resulting solution into about 10 volumes of acetone. The substance thrown out of solution is permitted to settle and the supernatant liquid withdrawn and the residue preferably treated several times with fresh acetone. After decanting the acetone from the last treatment, the resulting desired sodium salt may be dried preferably under vacuum.

Other metal carboxylate salts of the compounds such as the copper, gold, iron and bismuth salts and the like may be obtained by reacting the alkali metal salts, preferably in aqueous solution, with a suitable soluble salt of the metal, the carboxylate salt of which is desired. The desired carboxylate salt is obtained by resulting double decomposition.

The compounds of the invention, applicable in treating ailments of the intestinal tract, exhibit such activity by the introduction to the various nuclear portions of the individual compound, of substituents, the introduction of which into the basic nucleus leaves the compound substantially non-toxic so that it would cause no permanent injury to the subject when administered in the necessary therapeutic dosage. The metallic element in the compounds used as in preparations for treating intestinal ailments are such that their inclusion in the compound introduces similarly no unduly toxic characteristics. It is possible to build up a high concentration in the intestinal tract without a simultaneously high blood level.

The various compounds, used in the treatment of intestinal ailments are administered orally, either in the form of tablets, capsules or powders of the solid material, or as solutions of any suitable concentration thereof.

While the compounds constituting the invention have been described by reference to certain specific embodiments thereof, other modifications, extensions or substitutions may be made therein within the scope of the depending claims as limited by the state of the art.

What is claimed is:

1. A therapeutic preparation comprising as its primary therapeutically active constituent at least one member of the class of $N^3$-carboxyacyl-metanilamides and the carboxylates thereof, in which in addition to the carboxyacylamino group and the sulfonamide group in meta position to one another, the phenyl residue of the metanilamide structure is further substituted in a position selected from positions ortho and para to the sulfonamide radical by a substituent selected from the group consisting of alkyl, hydroxy, carboxy, alkoxy and halogen radicals, and in which one of the two remaining valences of the sulfonamido nitrogen is linked to a member of the class of hydrogen and a heterocyclic radical.

2. A therapeutic preparation as in claim 1, in which the further substituent on the phenyl residue of the metanilamide structure of the primary therapeutically active constituent is in position ortho to the sulfonamide group.

3. A therapeutic preparation as in claim 1, in which the further substituent on the phenyl residue of the metanilamide structure of the primary therapeutically active constituent is in position para to the sulfonamide group.

4. A therapeutic preparation as in claim 1, in which the further substituent on the phenyl residue of the metanilamide structure of the primary therapeutically active constituent is in position para to the sulfonamide group and is an alkyl radical, and in which one of the two remaining valences of the sulfonamido nitrogen is linked to the carbon atom in the 2-position of a thiazole radical.

5. A therapeutic preparation comprising as its primary therapeutically active constituent at least one member of the class of 2-(p-methyl-$N^3$-phthalylmetanilamido)-thiazole and the carboxylates thereof.

6. An $N^3$-carboxyacyl-metanilamide selected from 2-p-chloro-$N^3$-succinylmetanilamido-thiazole and the carboxylates thereof.

7. $N^3$-carboxyacyl-metanilamides selected from p-chloro-$N^3$-phthalylmetanilamide and the carboxylates thereof.

MAURICE L. MOORE.
TONY M. IMMEDIATA.

REFERENCES CITED

The following references are of record in the file of this patent:

UNITED STATES PATENTS

| Number | Name | Date |
|---|---|---|
| 2,274,716 | Lyford | Mar. 3, 1942 |
| 2,165,484 | Huismann | July 11, 1939 |

FOREIGN PATENTS

| Number | Country | Date |
|---|---|---|
| 789,578 | France | Oct. 31, 1935 |
| 317,338 | Great Britain | Aug. 13, 1929 |
| 515,412 | Great Britain | 1940 |

OTHER REFERENCES

Ser. No. 398,106, Hentrich (A. P. C.) pub. Apr. 20, 1943.